US009020909B2

(12) United States Patent
Jayaraman et al.

(10) Patent No.: US 9,020,909 B2
(45) Date of Patent: *Apr. 28, 2015

(54) ACTIVE FILE INSTANT CLONING (71) Applicant: Dell Products L.P., Round Rock, TX (US)

(72) Inventors: Vinod Jayaraman, San Francisco, CA (US); Goutham Rao, Los Altos, CA (US); Ratna Manoj Bolla, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/761,400

(22) Filed: Feb. 7, 2013

(65) Prior Publication Data
US 2013/0151471 A1 Jun. 13, 2013

Related U.S. Application Data (63) Continuation of application No. 13/076,271, filed on Mar. 30, 2011, now Pat. No. 8,396,843.

(60) Provisional application No. 61/354,644, filed on Jun. 14, 2010.

(51) Int. Cl.
G06F 17/00 (2006.01)
G06F 17/30 (2006.01)
(52) U.S. Cl.
CPC .... G06F 17/30174 (2013.01); G06F 17/30088 (2013.01); G06F 17/30156 (2013.01)
(58) Field of Classification Search
None
See application file for complete search history.

(56) References Cited

U.S. PATENT DOCUMENTS

| 7,293,133 | B1 * | 11/2007 | Colgrove et al. | 711/111 |
|---|---|---|---|---|
| 7,818,299 | B1 * | 10/2010 | Federwisch et al. | 707/649 |
| 7,873,599 | B2 | 1/2011 | Ishli et al. | |
| 8,472,782 | B2 * | 6/2013 | Murata | 386/219 |
| 8,656,386 | B1 * | 2/2014 | Baimetov et al. | 718/1 |
| 8,756,598 | B1 * | 6/2014 | Costea et al. | 718/1 |
| 2006/0212481 | A1 * | 9/2006 | Stacey et al. | 707/104.1 |
| 2008/0028007 | A1 * | 1/2008 | Ishii et al. | 707/204 |
| 2008/0163171 | A1 * | 7/2008 | Chess et al. | 717/120 |
| 2009/0150461 | A1 | 6/2009 | McClanahan | |
| 2009/0185786 | A1 * | 7/2009 | Murata | 386/83 |
| 2009/0222474 | A1 | 9/2009 | Alpern et al. | |
| 2009/0249335 | A1 * | 10/2009 | Vasilevsky et al. | 718/1 |
| 2009/0300079 | A1 | 12/2009 | Shitomi et al. | |
| 2010/0070725 | A1 * | 3/2010 | Prahlad et al. | 711/162 |
| 2010/0223610 | A1 * | 9/2010 | Dehaan et al. | 717/178 |

(Continued)

OTHER PUBLICATIONS

"U.S. Appl. No. 13/076,271, Non Final Office Action mailed Jul. 13, 2012", 12 pgs.
"U.S. Appl. No. 13/076,271, Notice of Allowance mailed Nov. 20, 2012", 12 pgs.
"Virtual Infrastructure SDK Programming Guide", Version 1.4 vmware, 1998-2006, 296 pgs.

(Continued)

Primary Examiner — Hung Le
(74) Attorney, Agent, or Firm — Kwan & Olynick LLP (57) ABSTRACT

Techniques and mechanisms are provided to instantly clone active files including active optimized files. When a new instance of an active file is created, a new stub is generated in the user namespace and a block map file is cloned. The block map file includes the same offsets and location pointers that existed in the original block map file. No user file data needs to be copied. If the cloned file is later modified, the behavior can be same as what happens when a de-duplicated file is modified.

18 Claims, 7 Drawing Sheets

(56) References Cited

U.S. PATENT DOCUMENTS

| | | |
|---|---|---|
| 2010/0235828 A1* | 9/2010 | Nishimura et al. ........... 717/174 |
| 2010/0257523 A1* | 10/2010 | Frank ................................ 718/1 |
| 2011/0035409 A1 | 2/2011 | Shimada et al. |
| 2011/0047340 A1* | 2/2011 | Olson et al. ................... 711/162 |
| 2011/0055299 A1 | 3/2011 | Phillips |
| 2011/0061045 A1 | 3/2011 | Phillips |
| 2011/0145196 A1 | 6/2011 | Bender |
| 2011/0161301 A1* | 6/2011 | Pratt et al. ..................... 707/661 |
| 2011/0246429 A1 | 10/2011 | Prahlad et al. |
| 2011/0246430 A1 | 10/2011 | Prahlad et al. |
| 2012/0084414 A1* | 4/2012 | Brock et al. .................. 709/221 |

OTHER PUBLICATIONS

Lagar-Cavilla, H.A., "SnowFlock: Rapid Virtual Machine Cloning for Cloud Computing", ACM, Apr. 2009, 12 pgs.

Lagar-Cavilla, H. A., "Flexible Computing with Virtual Machines", 2009, 181 pgs.

Shivam, Piyush et al., "Automated and On-Demand Provisioning of Virtual Machines for Database Applications", SIGMOD, Beijing, CN, Jun. 2007, 3 pgs.

Zhao, Ming et al., "Distributed File System Virtualization Techniques Supporting On-Demand Virtual Machine Environments for Grid Computing", Cluster Computing 9, Springer Science + Business Media, Inc., 2006, pp. 45-56.

* cited by examiner

| Filemap File X 401 | | |
|---|---|---|
| Offset 403 | Index 405 | Lname 407 |
| 0K | 0.1 | NULL |
| 8K | 0.2 | NULL |
| 16K | 0.3 | NULL |

Figure 4B

| Datastore Suitcase 471 | | |
|---|---|---|
| | Data Table 451 | |
| Index 453 | Data Offset 455 | Data Reference Count 457 |
| 1 | Offset-Data A | 1 |
| 2 | Offset-Data B | 1 |
| 3 | Offset-Data C | 1 |
| | Datastore | |
| | Data 461 | Last File 463 |
| 1 | Data A | File X 401 |
| 2 | Data B | File X 401 |
| 3 | Data C | File X 401 |

Figure 5

| Dictionary 501 | |
|---|---|
| Hash 511 | Storage Location 521 |
| a | Location 523 |
| b | Location 525 |
| c | Location 527 |

| Dictionary 551 | |
|---|---|
| Hash 561 | Storage Location 571 |
| i | Location 573 |
| j | Location 575 |
| k | Location 577 |

ACTIVE FILE INSTANT CLONING

CROSS-REFERENCE TO RELATED APPLICATION

This application claims benefit under 35 U.S.C. §120 to U.S. application Ser. No. 13/076,271 (DELLP016US), titled "ACTIVE FILE INSTANT CLONING," filed Mar. 30, 2011, which claims benefit under 35 U.S.C. §119(e) to U.S. Provisional Application 61/354,644 (DELLP016P), titled "ACTIVE FILE INSTANT CLONING," filed Jun. 14, 2010, both of which are incorporated by reference for all purposes.

TECHNICAL FIELD

The present disclosure relates to active file instant cloning.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or a hash of the actual data. Once the segment ID is generated, it can be used to determine if the data segment already exists in the system. If the data segment does exist, it need not be stored again.

In many conventional implementations, new instances of an active file need to be created on demand. Mechanisms for creating new instances of active files including active optimized files are limited and typically require significant computing resources. Consequently, mechanisms are provided for improving active file instant cloning.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of files. However, it should be noted that the techniques and mechanisms of the present invention apply to a variety of different data constructs including files, blocks, etc. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms are provided to instantly clone active files including active optimized files. When a new instance of an active file is created, a new stub is generated in the user namespace and a block map file is cloned. The block map file includes the same offsets and location pointers that existed in the original block map file. No user file data needs to be copied. If the cloned file is later modified, the behavior can be same as what happens when a de-duplicated file is modified.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compressions algorithms operate in a variety of manners, but many compression algorithms analyze data to determine source sequences in data that can be mapped to shorter code words. In many implementations, the most frequent source sequences or the most frequent long source sequences are replaced with the shortest possible code words.

Data deduplication reduces storage footprints by reducing the amount of redundant data. Deduplication may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a fixed or sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a NAS drive that a user can manipulate to backup and archive files.

In an active file system, files can be requested to be optimized at any arbitrary time, by way of policy or by way of end user explicit directives. These files must still be considered active files and can be fairly large. These files cannot be taken off line while they are optimized, and applications must still have the ability to perform all file system operations such as read, write, unlink, and truncate on them while optimization is in progress.

Figure 1:
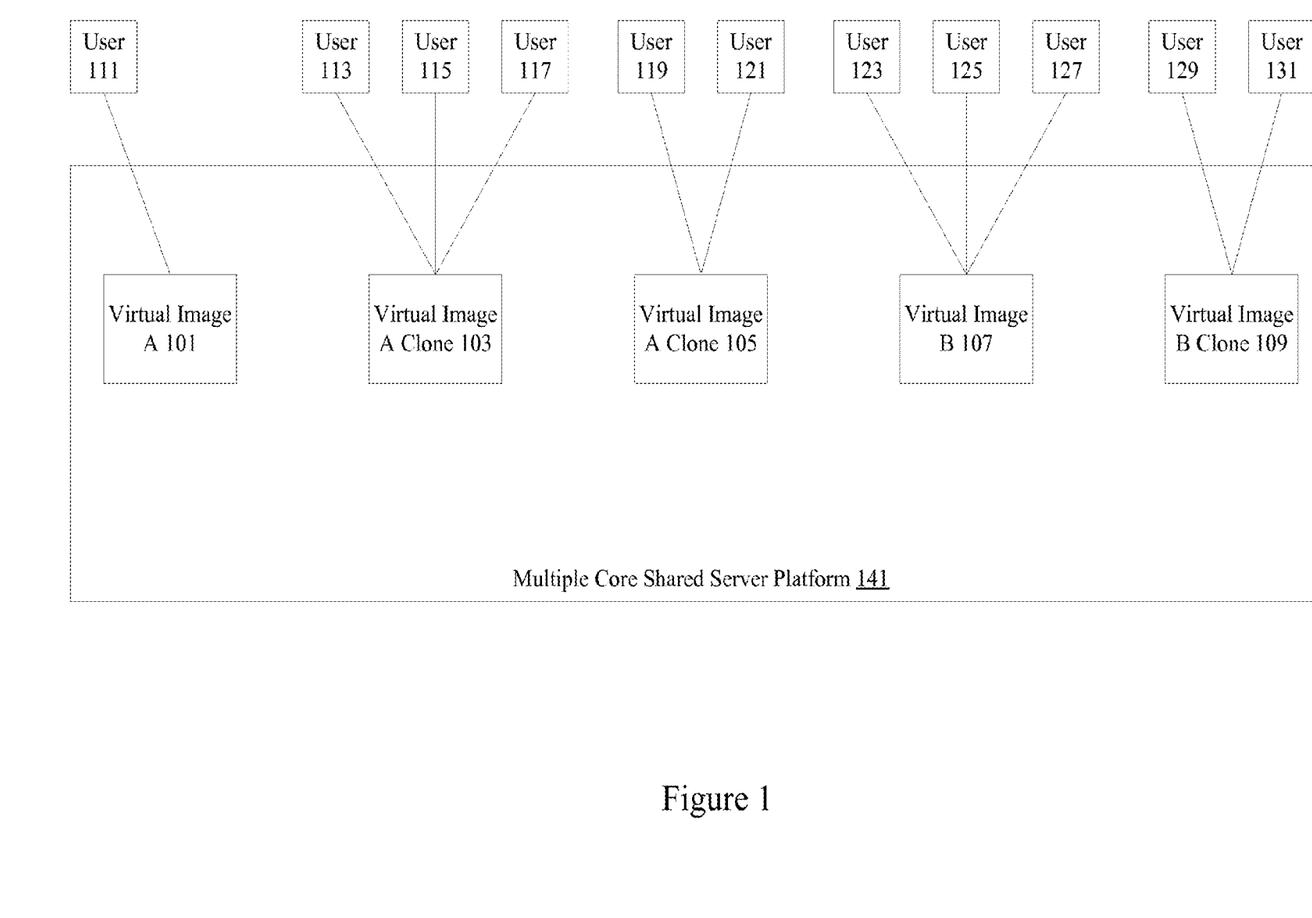
FIG. 1 illustrates a particular example of a system that can use the techniques and mechanisms of the present invention.

Furthermore, the techniques of the present invention recognize that users may need to periodically create new instances of active files including active optimized files. Some use cases require that a file be cloned and made available for use right away. An example scenario is how cloud service providers use clones to create new instances of a virtual machine. FIG. 1 illustrates one example of a system that can use the techniques and mechanisms of the present invention. According to various embodiments, a compute cloud service provider often needs to create new instances of a virtual machine.

FIG. 1 shows a multi-tenant on demand infrastructure. Multiple virtual machines including virtual machines correpsonding to virtual images 101, 103, 105, 107, and 109 are running on a multiple processor core shared server platform 141. According to various embodiments, virtual image A 101 is running a server operating system, a database server, as well as one or more custom applications. Virtual images 103 and 105 are clones of virtual image A 101. According to various embodiments, virtual image B 107 is running a server operating system, a database server, a web server, and/or one or more custom applications. Virtual image 109 is a clone of virtual image B 107. In particular embodiments, a user 111 is connected to a virtual image A 101. Users 113, 115, and 117 are connected to a virtual image A clone 103. Users 119 and 121 are connected to virtual image A clone 105. Users 123, 125, and 127 are connected to virtual image B 107. Users 129 and 131 are connected to virtual image B clone 133.

A compute cloud service provider allows a user to create new instances of virtual images on demand. These new instances may be clones of exiting virtual machine images. An object optimization system provides application program interfaces (APIs) which can be used to instantly clone a file. When the API is used, a new stub is put in the user namespace and a block map file is cloned.

In particular embodiments, every file maintained in an object optimization system is represented by a block map file that represents all objects found in that file. The block map file includes the offsets and sizes of each object. Each entry in a block map file then points to a certain offset within a data suitcase. According to various embodiments, many block map files will be pointing to fewer data suitcases, hence resulting in multiple files sharing the same data blocks.

According to various embodiments, during instant cloning, the block map file maintains all of the same offsets and location pointers as the original file's block map, so no user file data need be copied. In particular embodiments, if the cloned file is later modified, the behavior is the same as what happens when a deduplicated file is modified.

Figure 2:
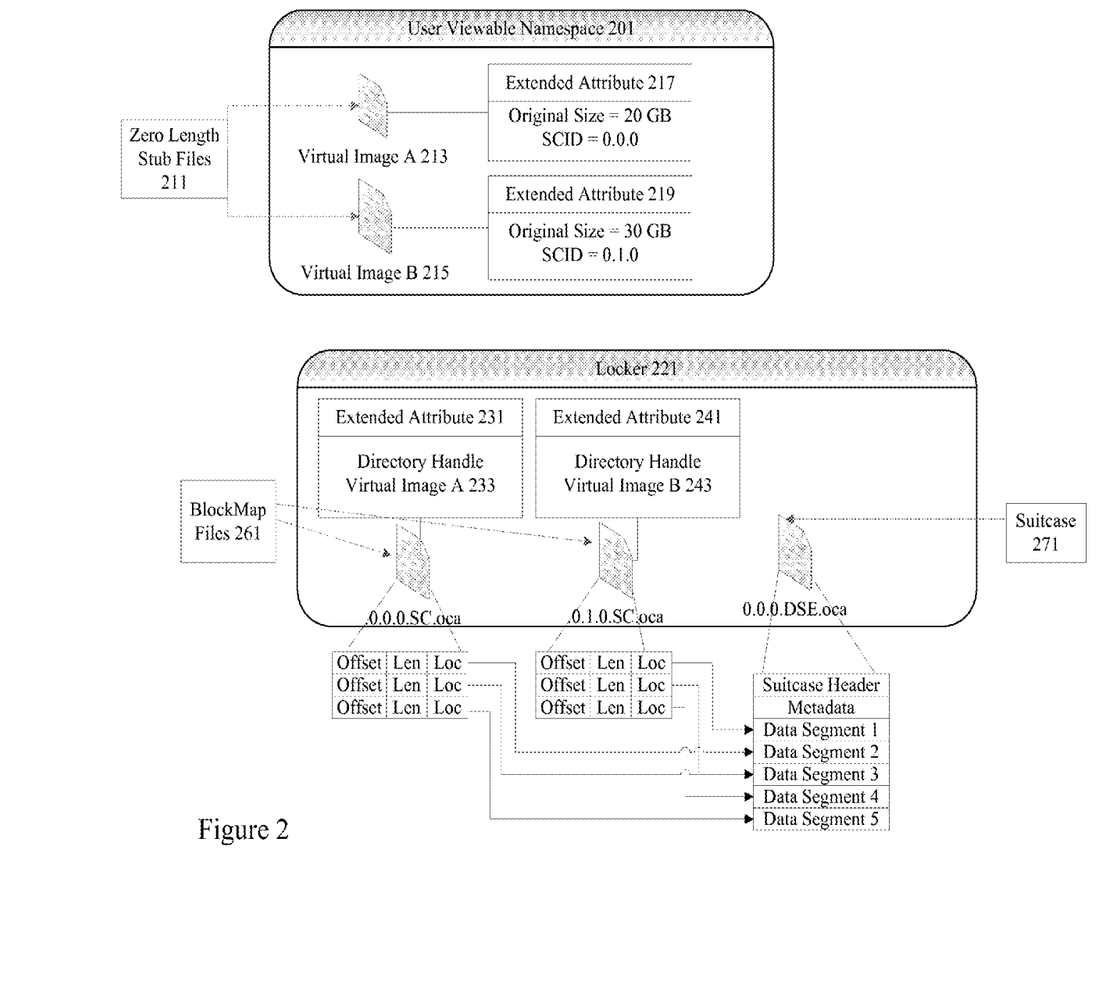
FIG. 2 illustrates one example of a locker prior to cloning.

FIG. 2 illustrates one example of an optimized file structure prior to cloning. According to various embodiments, an optimization system is told where it will store its data structures, where the data input stream is coming from, what the scope of optimization is, which optimization actions to apply to the stream, and how to mark data as having been optimized Data is then optimized. In particular embodiments, optimized data is stored in a locker 221. The locker 221 can be a directory, a volume, a partition, or an interface to persistent object storage. Within that locker 221, optimized data is stored in containers or structures such as suitcase 271. In a file system, each suitcase 271 could be a file. In block or object storage, other formats may be used. Prior to cloning, a user viewable namespace 201 includes multiple stub files 211. According to various embodiments, stub files 211 correspond to virtual image A 213 and virtual image B 215. Virtual image A 213 is associated with extended attribute information 217 including file size data and/or other metadata. Virtual image B 215 is associated with extended attribute information 219 including file size data and/or other metadata.

According to various embodiments, optimized data is maintained in a locker 221. Block map files 261 include offset, length, and location identifiers for locating appropriate data segments in a datastore suitcase 271. Multiple block map files may point to the same data segments in a data store suitcase. Each blockmap file also has corresponding extended attribute information 231 and 241 corresponding to directory handle virtual image A 233 and directory handle virtual image B 243.

Figure 3:
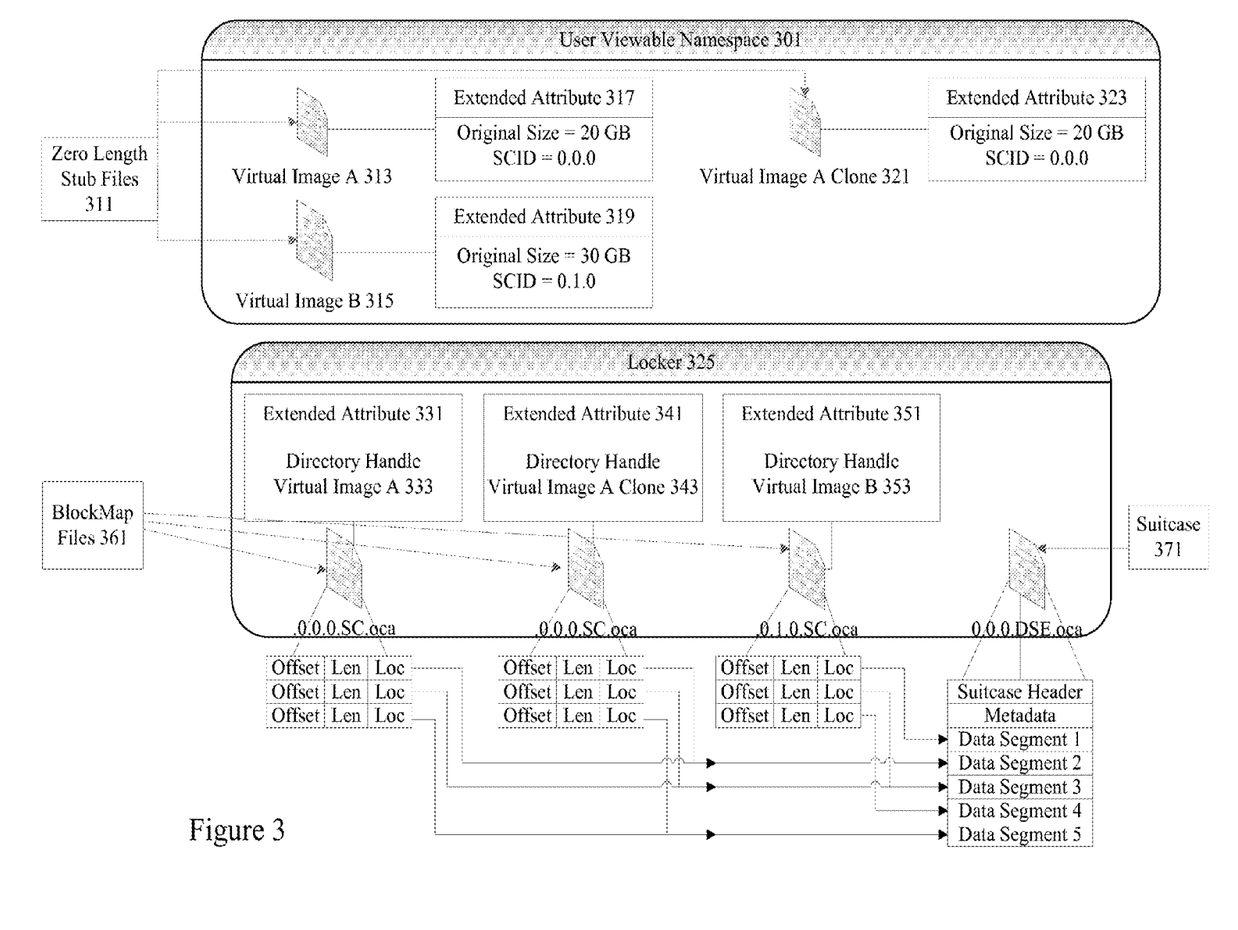
FIG. 3 illustrates one example of a locker after cloning.

FIG. 3 illustrates one example of a locker after instant cloning. Upon instant cloning of image A, zero length stub files 311 now include virtual image A 313, virtual image A clone 321, and virtual image B 315 in the user viewable namespace 301. Virtual image A 313 is associated with extended attribute information 317 including file size data and/or other metadata. Virtual image A clone 321 is associated with extended attribute information 323 and/or other metadata. Virtual image B 315 is associated with extended attribute information 319 including file size data and/or other metadata. According to various embodiments, metadata is included in the user viewable namespace 301 to allow ease of access to file attributes without having to access optimized data.

According to various embodiments, optimized data is maintained in a locker 325. Block map files 361 include offset, length, and location identifiers for locating appropriate data segments in a datastore suitcase 371. In particular embodiments, blockmap file for virtual image A and virtual image A clone have the same offset, length, and location parameters. Virtual image A has extended attribute information 331 and directory handle virtual image A 333. Virtual image A clone has extended attribute information 341 and directory handle virtual image A clone 343. Virtual image B has extended attribute 351 has directory handle virtual image B 353. Multiple block map files may point to the same data segments in a data store suitcase 371. According to various embodiments, even though the virtual image A is replicated in the user viewable namespace 301, and a directory handle and extended attributed information is replicated in locker 325, the data segments themselves in suitcase 371 need not be replicated.

Figure 4A:
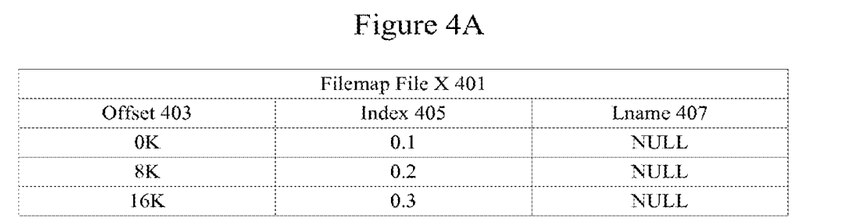
FIG. 4A illustrates a particular example of a filemap.
Figure 4B:
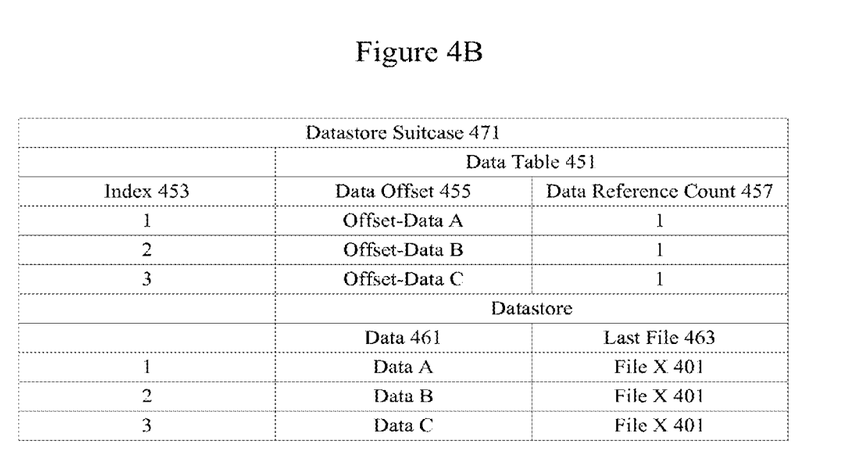
FIG. 4B illustrates a particular example of a datastore suitcase.

FIG. 4A illustrates one example of a block map file or filemap and FIG. 4B illustrates a corresponding datastore suitcase created after optimizing a file X. Filemap file X 401 includes offset 403, index 405, and lname 407 fields. According to various embodiments, each segment in the filemap for file X is 8K in size. In particular embodiments, each data segment has an index of format <Datastore Suitcase ID>.<Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 407 is NULL in the filemap because each segment has not previously been referenced by any file.

FIG. 4B illustrates one example of a datastore suitcase corresponding to the filemap file X 401. According to various embodiments, datastore suitcase 471 includes an index portion and a data portion. The index section includes indices 453, data offsets 455, and data reference counts 457. The data section includes indices 453, data 461, and last file references 463. According to various embodiments, arranging a data table 451 in this manner allows a system to perform a bulk read of the index portion to obtain offset data to allow parallel reads of large amounts of data in the data section.

According to various embodiments, datastore suitcase 471 includes three offset, reference count pairs which map to the data segments of the filemap file X 401. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 401 which was last to place a reference on the data A. Index 2 includes data B and a reference to File X 401 which was last to place a reference on the data B. Index 3 includes data C and a reference to File X 401 which was last to place a reference on the data C.

According to various embodiments, the dictionary is a key for the deduplication system. The dictionary is used to identify duplicate data segments and point to the location of the data segment. When numerous small data segments exist in a system, the size of a dictionary can become inefficiently large. Furthermore, when multiple optimizers nodes are working on the same data set they will each create their own dictionary. This approach can lead to suboptimal deduplication since a first node may have already identified a redundant data segment but a second node is not yet aware of it because the dictionary is not shared between the two nodes. Thus, the second node stores the same data segment as an original segment. Sharing the entire dictionary would be possible with a locking mechanism and a mechanism for coalescing updates from multiple nodes. However, such mechanisms can be complicated and adversely impact performance.

Consequently, a work partitioning scheme can be applied based on segment ID or hash value ranges for various data segments. Ranges of hash values are assigned to different nodes within the cluster. If a node is processing a data segment which has a hash value which maps to another node, it will contact the other node that owns the range to find out if the data segments already exist in a datastore.

Figure 5:
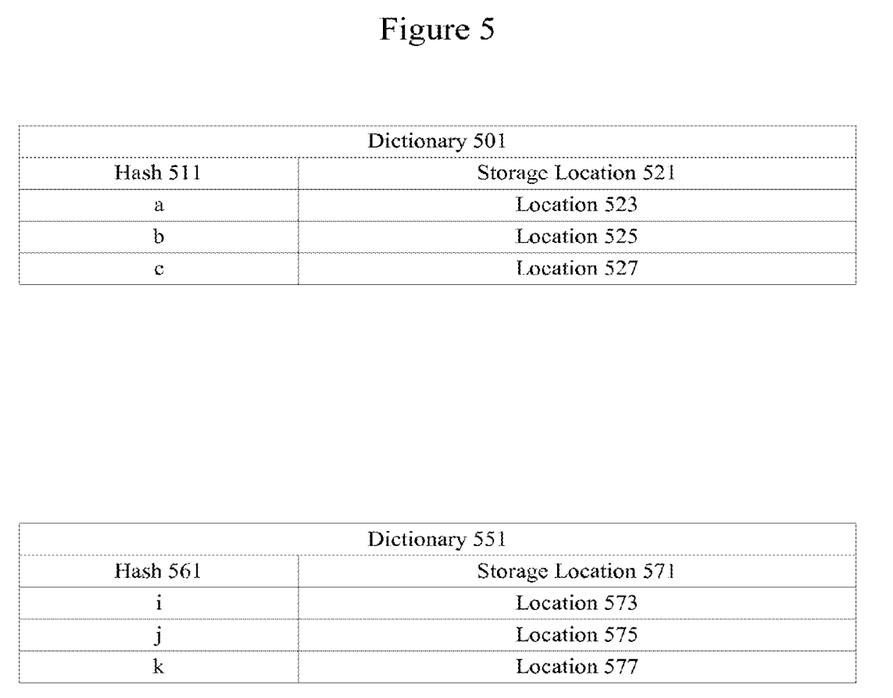
FIG. 5 illustrates a particular example of a deduplication dictionary.

FIG. 5 illustrates multiple dictionaries assigned to different segment ID or hash ranges. Although hash ranges are described, it should be recognized that the dictionary index can be hash ranges, reference values, or other types of keys. According to various embodiments, the hash values are SHA1 hash values. In particular embodiments, dictionary 501 is used by a first node and includes hash ranges from 0x0000 0000 0000 0000-0x0000 0000 FFFF FFFF. Dictionary 551 is used by a second node and includes hash ranges from 0x0000 0001 0000 0000-0X0000 0001 FFFF FFFF. Hash values 511 within the range for dictionary 501 are represented by symbols a, b, and c for simplicity. Hash values 561 within the range for dictionary 551 are represented by symbols i, j, and k for simplicity. According to various embodiments, each hash value in dictionary 501 is mapped to a particular storage location 521 such as location 523, 525, or 527. Each hash value in dictionary 551 is mapped to a particular storage location 571 such as location 573, 575, and 577.

Having numerous small segments increases the likelihood that duplicates will be found. However, having numerous small segments decreases the efficiency of using the dictionary itself as well as the efficiency of using associated filemaps and datastore suitcases.

Figure 6A:
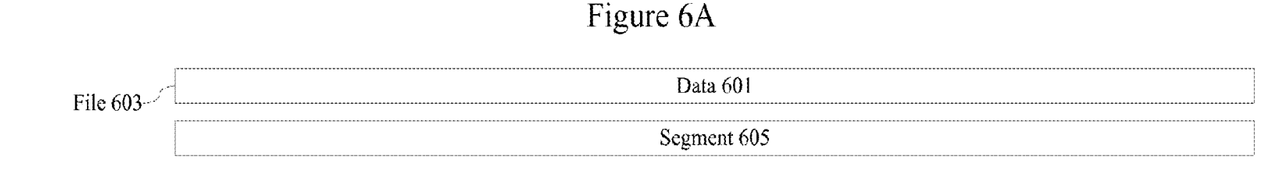
FIG. 6A illustrates a particular example of a file having a single data segment.

FIG. 6A illustrates one example of a non-container file. According to various embodiments, container files such as ZIP files, archives, productivity suite documents such as .docx, .xlsx, etc., include multiple objects of different types. Non-container files such as images and simple text files typically do not contain disparate objects.

According to various embodiments, it is recognized that certain types of non-container files do not benefit from having a segment size smaller than the size of the file itself. For example, many image files such as .jpg and .tiff files do not have many segments in common with other .jpg and .tiff files. Consequently, selecting small segments for such file types is inefficient. Consequently, the segment boundaries for an image file may be the boundaries for the file itself. For example, noncontainer data 601 includes file 603 of a type that does not benefit from finer grain segmentation. File types that do not benefit from finer grain segmentation include image files such as .jpg, .png, .gif, .and .bmp files. Consequently, file 603 is provided with a single segment 605. A single segment is maintained in the deduplication dictionary. Providing a single large segment encompassing an entire file can also make compression of the segment more efficient. According to various embodiments, multiple segments encompassing multiple files of the same type are compressed at the same time. In particular embodiments, only segments having data from the same type of file are compressed using a single compression context. It is recognized that specialized compressors may be applied to particular segments associated with the same file type.

Figure 6B:
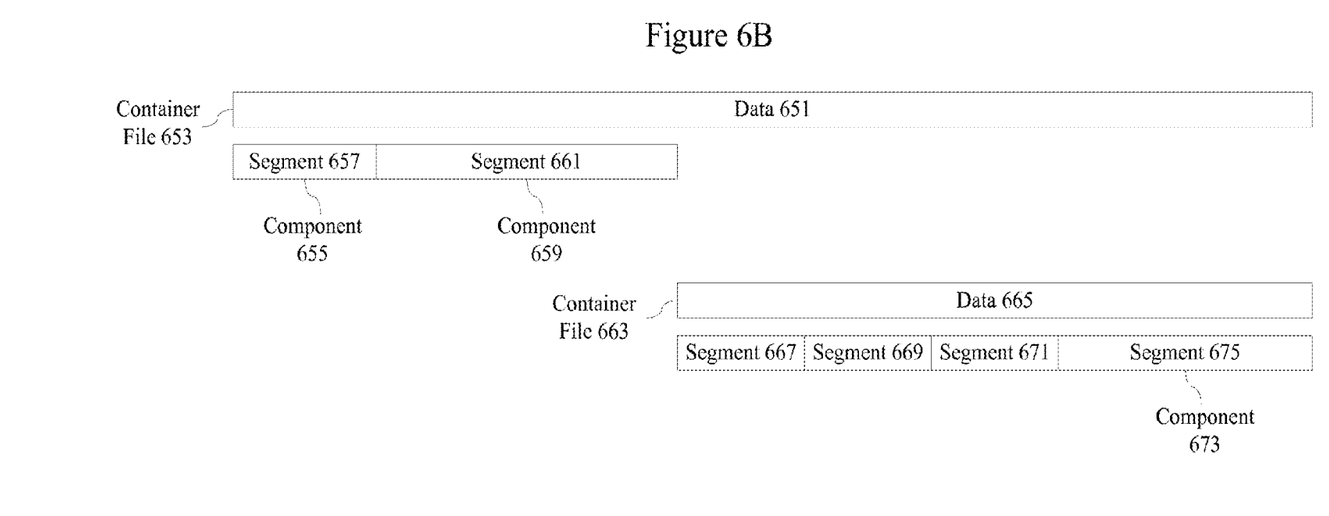
FIG. 6B illustrates a particular example of a file having multiple data segments and components.

FIG. 6B illustrates one example of a container file having multiple disparate objects. Data 651 includes a container file that does benefit from more intelligent segmentation. According to various embodiments, segmentation can be performed intelligently while allowing compression of multiple segments using a single compression context. Segmentation can be implemented in an intelligent manner for deduplication while improving compression efficiency. Instead of selecting a single segment size or using a sliding segment window, file 653 is delayered to extract file components. For example, a .docx file may include text, images, as well as other container files. For example, file 653 may include components 655, 659, and 663. Component 655 may be a component that does not benefit from finer grain segmentation and consequently includes only segment 657. Similarly, component 659 also includes a single segment 661. By contrast, component 663 is actually an embedded container file 663 that includes not only data that does benefit from additional segmentation but also includes another component 673. For example, data 665 may include text. According to various embodiments, the segment size for text may be a predetermined size or a dynamic or tunable size. In particular embodiments, text is separated into equal sized segments 667, 669, and 671. Consequently, data may also include a non-text object 673 that is provided with segment boundaries aligned with the object boundaries 675.

Figure 7:
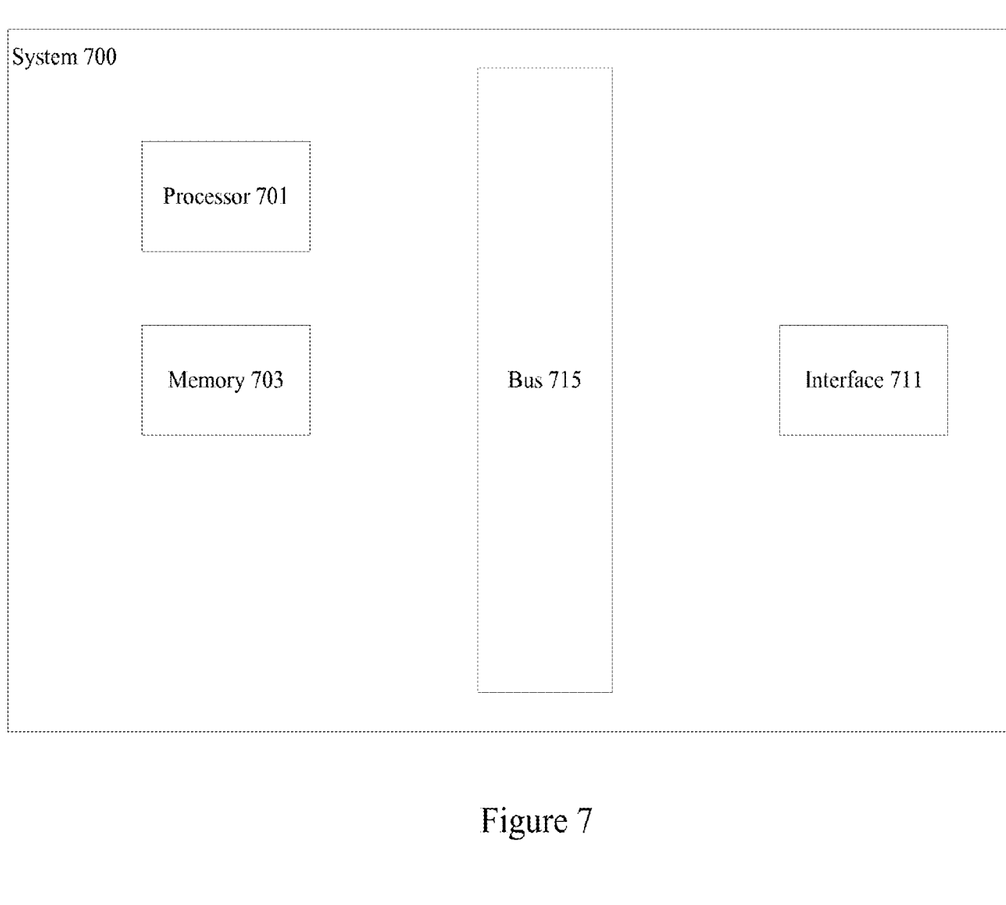
FIG. 7 illustrates a particular example of a computer system.

A variety of devices and applications can implement particular examples of network efficient deduplication. FIG. 7 illustrates one example of a computer system. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
receiving a request to clone an active and optimized file, the active and optimized file associated with a block map file, the block map file referencing a plurality of objects including a plurality of data segments included in the active and optimized file, wherein the active and optimized file is a virtual image associated with a virtual machine; and
cloning the block map file to create a cloned block map file, the cloned block map file referencing the same plurality of objects including the plurality of data segments included in the active and optimized file, wherein a stub file associated with the active and optimized file is cloned to a create a cloned stub file, and wherein the cloned stub file appears in a user viewable namespace as a file separate from the stub file.

2. The method of claim 1, wherein the active and optimized file has been deduplicated.

3. The method of claim 1, wherein the active and optimized file has been compressed.

4. The method of claim 1, wherein the stub file is associated with extended attribute information in the user viewable namespace.

5. The method of claim 4, wherein the block map file is associated with the same extended attributed information in a user inaccessible locker.

6. The method of claim 1, wherein the cloned stub file is associated with extended attribute information in the user viewable namespace.

7. The method of claim 6, wherein the cloned block map file is associated with the same extended attribute information in a user inaccessible locker.

8. The method of claim 1, wherein the block map file includes offset, length, and location information pointing to data segments in a datastore suitcase.

9. The method of claim 8, wherein the cloned block map file includes the same offset, length, and location information pointing to the same data segments in the datastore suitcase.

10. A system comprising:
an interface configured to receive a request to clone an active and optimized file, the active and optimized file corresponding to a block map file, the block map file referencing a plurality of objects including a plurality of data segments found in the active and optimized file, wherein the active and optimized file is a virtual image associated with a virtual machine running on a system; and
a processor configured to clone the block map file to create a cloned block map file, the cloned block map filed referencing the same plurality of objects including the plurality of data segments found in the active and optimized file, wherein a stub file associated with the active and optimized file is cloned to a create a cloned stub file, and wherein the cloned stub file appears in a user viewable namespace as a file separate from the stub file.

11. The system of claim 10, wherein the active and optimized file has been deduplicated.

12. The system of claim 10, wherein the active and optimized file has been compressed.

13. The system of claim 10, wherein the stub file is associated with extended attribute information in the user viewable namespace.

14. The system of claim 13, wherein the block map file is associated with the same extended attributed information in a user inaccessible locker.

15. The system of claim 10, wherein the cloned stub file is associated with extended attribute information in the user viewable namespace.

16. The system of claim 15, wherein the cloned block map file is associated with the same extended attribute information in a user inaccessible locker.

17. The system of claim 10, wherein the block map file includes offset, length, and location information pointing to data segments in a datastore suitcase.

18. A non-transitory computer readable medium comprising:
   computer code for receiving a request to clone an active and optimized file, the active and optimized file associated with a block map file, the block map file referencing a plurality of objects including a plurality of data segments included in the active and optimized file, wherein the active and optimized file is a virtual image associated with a virtual machine; and
   computer code for cloning the block map file to create a cloned block map file, the cloned block map file referencing the same plurality of objects including the plurality of data segments included in the active and optimized file, wherein a stub file associated with the active and optimized file is cloned to a create a cloned stub file, and wherein the cloned stub file appears in a user viewable namespace as a file separate from the stub file.

* * * * *